US008700541B2

(12) United States Patent
Ouyang et al.

(10) Patent No.: US 8,700,541 B2
(45) Date of Patent: Apr. 15, 2014

(54) MODELING METHOD OF NEURO-FUZZY SYSTEM

(75) Inventors: Chen-Sen Ouyang, Kaohsiung (TW); Rong-Ching Wu, Kaohsiung (TW); Ching-Tai Chiang, Pingtung (TW); Jong-Ian Tsai, Kaohsiung (TW)

(73) Assignee: I-Shou University, Kaohsiung (TW)

( * ) Notice: Subject to any disclaimer, the term of this patent is extended or adjusted under 35 U.S.C. 154(b) by 289 days.

(21) Appl. No.: 13/364,829

(22) Filed: Feb. 2, 2012

(65) Prior Publication Data

US 2013/0204818 A1    Aug. 8, 2013

(51) Int. Cl.
*G06F 15/18* (2006.01)
*G06N 3/08* (2006.01)

(52) U.S. Cl.
USPC ................................. 706/2; 706/25

(58) Field of Classification Search
CPC ....................................................... G06N 7/02
See application file for complete search history.

(56) References Cited

U.S. PATENT DOCUMENTS 6,317,730 B1    11/2001    Neuneier et al.
2009/0216347 A1    8/2009    Mahfouf et al.

OTHER PUBLICATIONS

Ouyang, Chen-Sen, and Shie-Jue Lee. "A hybrid algorithm for structure identification of neuro-fuzzy modeling." Systems, Man, and Cybernetics, 2000 IEEE International Conference on. vol. 5. IEEE, 2000.*
Lee, Shie-Jue, and Chen-Sen Ouyang. "A neuro-fuzzy system modeling with self-constructing rule generationand hybrid SVD-based learning." Fuzzy Systems, IEEE Transactions on 11.3 (2003): 341-353.*
Ouyang, Chen-Sen, Wan-Jui Lee, and Shie-Jue Lee. "A TSK-type neurofuzzy network approach to system modeling problems." Systems, Man, and Cybernetics, Part B: Cybernetics, IEEE Transactions on 35.4 (2005): 751-767.*
Ouyang, Chen-Sen, and Shie-Jue Lee. "An improved learning algorithm for rule refinement in neuro-fuzzy modeling." Knowledge-Based Intelligent Information Engineering Systems, 1999. Third International Conference. IEEE, 1999.*
Lee, Wan-Jui, Chen-Sen Ouyang, and Shie-Jue Lee. "Constructing neuro-fuzzy systems with TSK fuzzy rules and hybrid SVD-based learning." Fuzzy Systems, 2002. FUZZ-IEEE'02. Proceedings of the 2002 IEEE International Conference on. vol. 2. IEEE, 2002.*
Won, Jin M., Sang Y. Park, and Jin S. Lee. "Parameter conditions for monotonic Takagi-Sugeno-Kang fuzzy system." Fuzzy Sets and Systems 132.2 (2002): 135-146.*

* cited by examiner

*Primary Examiner* — Kakali Chaki
*Assistant Examiner* — Daniel Pellett
(74) *Attorney, Agent, or Firm* — Muncy, Geissler, Olds & Lowe, P.C.

(57) ABSTRACT

A modeling method of neuro-fuzzy system including a rule-defining process and a network-building process is disclosed. The rule-defining process divides a plurality of training data into a plurality of groups to accordingly define a plurality of fuzzy rules, and the network-building process constructs a fuzzy neural network based on the fuzzy rules obtained by the rule-defining process. The provided modeling method of neuro-fuzzy system is capable of building a neuro-fuzzy system extremely similar to an original function that generates training data of the neuro-fuzzy system.

5 Claims, 4 Drawing Sheets

MODELING METHOD OF NEURO-FUZZY SYSTEM

BACKGROUND OF THE INVENTION

1. Field of the Invention

The present invention relates to a modeling method of a software system and, more particularly, to a modeling method of a neuro-fuzzy system.

2. Description of the Related Art

Neuro-fuzzy system is presently used for system modeling or training. Conventionally, the way to construct a neuro-fuzzy system is defining fuzzy rules according to training data and refining the fuzzy rules to obtain an output function set through function approximation. Specifically, the obtained output function set is capable of presenting the training data of limited number and producing an output according to an input. Once the output function set of the fuzzy rules is obtained, it can be used in engineering fields such as automatic control and system identification so as to operate a hardware system in the way matching users' requirements.

Presently, a modeling method of a neuro-fuzzy system usually includes two phases: "structure identification" and "parameter identification." The structure identification defines a base model, which is built by the fuzzy rules, in correspondence with the training data, and then the parameter identification adjusts parameters in the base model by a learning algorithm. Generally, the modeling result of the constructed neuro-fuzzy system with refined parameters adjusted by the parameter identification may be insufficient if the base model defined by the structure identification is not proper. Therefore, a preferable way to define a proper base model of a neuro-fuzzy system is important in a modeling method thereof.

Specifically, the structure identification is clustering-based usually. The training data is previously divided into a plurality of groups by data clustering, with each group presented by one of the fuzzy rules, and thus a neural network is built in correspondence with the fuzzy rules. Conventionally, each fuzzy rule is presented in the Takagi-Sugeno-Kang (TSK) type, and the following is the jth fuzzy rule for example.

IF $x_1$ is $A_{j,1}$ and $x_2$ is $A_{j,2}$ and ... and $x_n$ is $A_{j,n}$, THEN
$y$ is $c_{j,0}+c_{j,1}x_1+c_{j,2}x_2+ \ldots +c_{j,n}x_n$, wherein the "$x_i$," with "i" being a number between "1" through "n," is the ith dimension of the input of the neuro-fuzzy system, the "y" is the output of the neuro-fuzzy system, the "$A_{j,i}$" is the membership function of the "$x_i$" in the jth fuzzy rule, the $c_{j,i\times i}$ is a weighted coefficient of the ith dimension of the input in the jth fuzzy rule, $c_{j,0}$ is a constant, and the "n" is the total of the dimensions of the input.

However, all the weighted coefficients $c_{j,i\times i}|_n^{i=0}$ are usually identified by the parameter identification except for the first weighted coefficient $c_{j,0}$ that is identified by the structure identification, and thus the speed to obtain the output function set is slow as well as the cost in computation of learning is large. Therefore, a new modeling method of neuro-fuzzy system is needed.

SUMMARY OF THE INVENTION

It is therefore the primary objective of this invention to provide a modeling method of neuro-fuzzy system capable of building a neuro-fuzzy system extremely similar to an original function that generates training data of the neuro-fuzzy system.

The invention discloses a modeling method of neuro-fuzzy system including a rule-defining process and a network-building process. The rule-defining process divides a plurality of training data into a plurality of groups to accordingly define a plurality of fuzzy rules. The network-building process constructs a fuzzy neural network based on the fuzzy rules obtained by the rule-defining process. Specifically, the rule-defining process further comprises a sub-process (a) retrieving an input-output pair of the training data, a sub-process (b) determines whether any fuzzy rule is built so as to execute a sub-process (c) if no fuzzy rule is built or to execute a sub-process (e) if at least one fuzzy rule has been built, the sub-process (c) defining a fuzzy rule corresponding to the retrieved input-output pair by function approximation, a sub-process (d) determining whether there is any ungrouped input-output pair of the training data so as to execute the network-building process if no ungrouped input-output pair exists or to execute the sub-process (a) otherwise, and the sub-process (e) calculating an input similarity value and an output difference value between the retrieved input-output pair and a respect fuzzy rule for each one of the fuzzy rules, determining whether the input similarity value of a respect fuzzy rule is larger than or equal to a similarity threshold value as well as the output difference value of this fuzzy rule is smaller than or equal to a difference threshold value, assigning the retrieved input-output pair into a group corresponding to one of the fuzzy rules and then renewing coefficients of this fuzzy rule if any fuzzy rule has an input similarity value not smaller than the similarity threshold value as well as the output difference value thereof is not larger than the difference threshold value or executing the sub-process (c) otherwise, wherein the fuzzy rule corresponding to the group including the retrieved input-output pair has a largest input similarity value.

The invention further discloses that the sub-process (e) comprises: a step (i) calculating the input similarity values through a similarity equation, and executing the sub-process (c) if each input similarity value is smaller than the similarity threshold value or executing a step (ii) if at least one of the input similarity values is larger than or equal to the similarity threshold value; the step (ii) calculating the output difference values through a difference equation, and executing the sub-process (c) if each output difference value is larger than the difference threshold value or executing a step (iii) if at least one of the input similarity values is smaller than or equal to the difference threshold value; the step (iii) comparing the input similarity values of the fuzzy rules, assigning the retrieved input-output pair into the group corresponding to the fuzzy rule with the largest input similarity value, and executing a step (iv); and the step (iv) renewing the coefficients of the fuzzy rule having the largest input similarity value and executing the sub-process (d).

The invention further discloses that the similarity equation is $$G_j(\vec{a}(t)) = \prod_{i=1}^{n} \exp\left[-\left(\frac{a_i(t)-m_{ij}}{\sigma_{ij}}\right)^2\right],$$

with j=1, 2, ..., J, the $m_{ij}$ representing a mean parameter, and the $\sigma_{ij}$ representing a standard deviation parameter.

The invention further discloses that the difference equation is $$d_j(t) = \frac{|(c_{j,0} + c_{j,1}(t)a_1(t) + \ldots + c_{j,n}a_n(t) - b(t))|}{\sqrt{c_{j,1}^2 + c_{j,2}^2 + \ldots + c_{j,n}^2}},$$

wherein the b(t) represents the output of the tth input-output pair, and the $\vec{a}(t)=(a_1(t),a_2(t), \ldots a_n(t))$ represents the input vector.

The invention further discloses that recursive singular value decomposition serves as the function approximation in sub-process (c).

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

Figure 1:
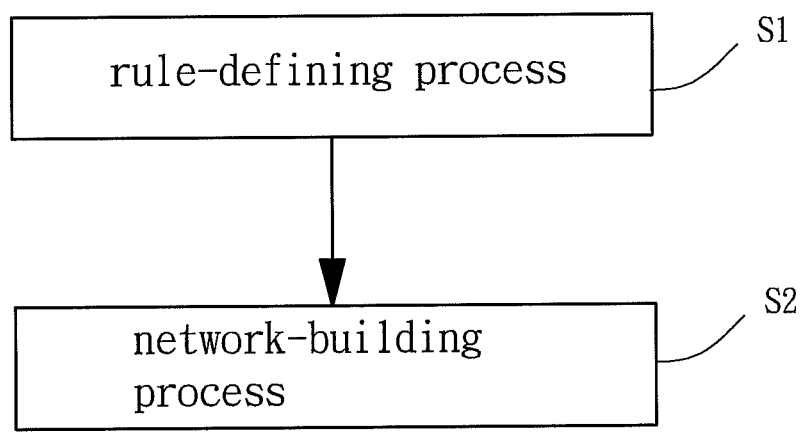
FIG. 1 shows a block diagram of a modeling method of neuro-fuzzy system according to a preferable embodiment of the invention.
Figure 2:
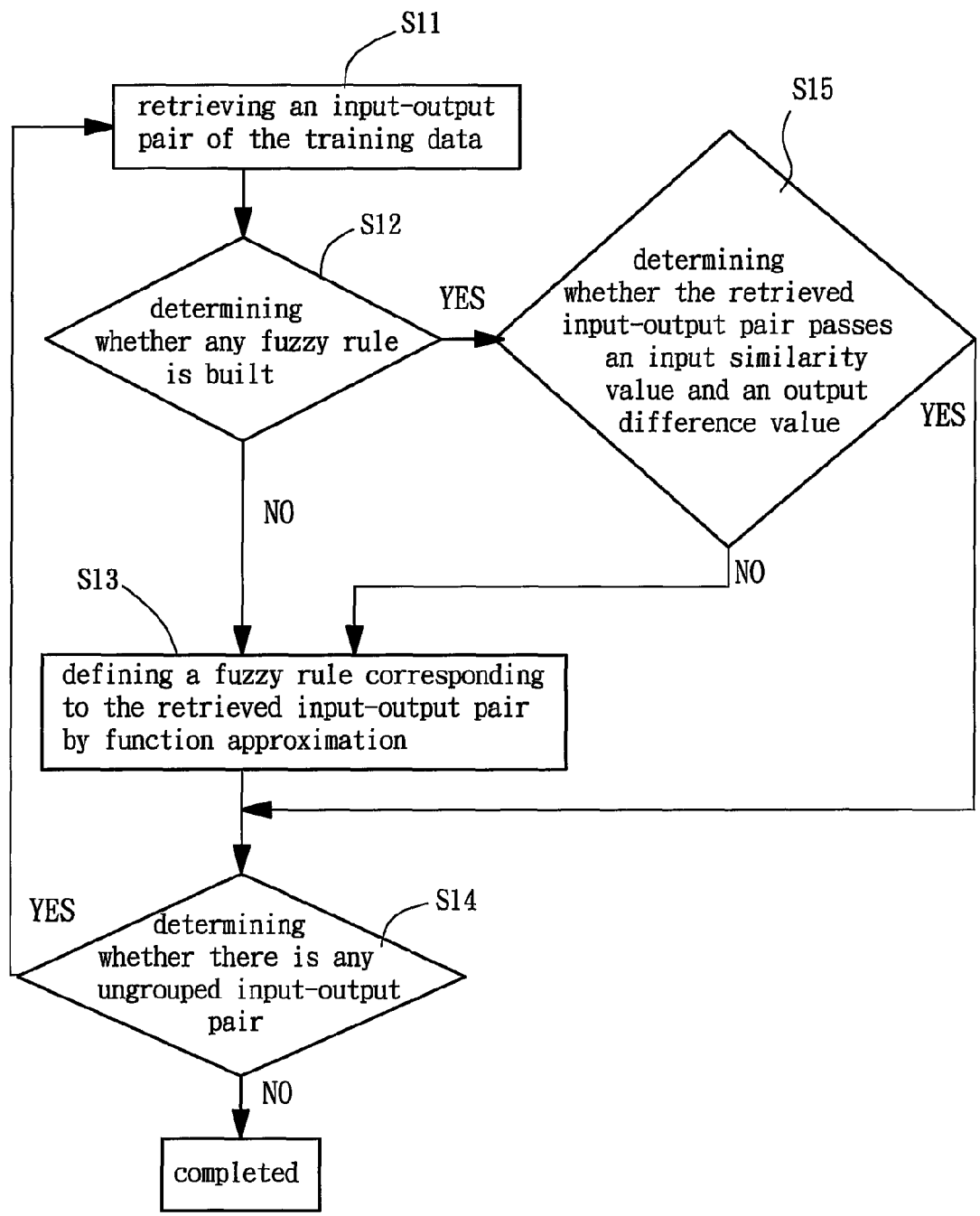
FIG. 2 shows a flow chart of a rule-defining process of the preferable embodiment.

FIG. 1 shows a block diagram of a modeling method of a neuro-fuzzy system according to a preferable embodiment of the invention, which includes a rule-defining process S1 and a network-building process S2 and is executed by a computer. Specifically, the computer should have a data storage unit and a computing unit, wherein the data storage unit stores training data and the computing unit retrieves the training data and constructs a neuro-fuzzy system.

The rule-defining process S1 divides a plurality of training data into a plurality of groups and accordingly defines a plurality of fuzzy rules, with each group corresponding to one of the fuzzy rules, wherein the training data includes a plurality of input-output pairs while each input-output pair has an input and an output corresponding to the input, while the input is a vector with n dimensions and the output is a value in this embodiment. Each fuzzy rule can establish an output function by function approximation, and thus an output function set constructed by the output functions of the fuzzy rules is built for the network-building process S2.

Specifically, the rule-defining process S1 includes sub-processes S11-S15. In the sub-process S11, the computing unit retrieves an input-output pair of the training data, which is not assigned to any group, from the data storage unit. Specifically, all the input-output pairs constructing the training data can be presented by the following equation (1):

$$\{(\vec{a}(t),b(t))|t=1,2,\ldots N\}, \vec{a}(t)=(a_1(t),a_2(t),\ldots a_n(t)) \quad (1),$$

wherein the b(t) represents the output of the tth input-output pair, and the $\vec{a}(t)$ represents the input vector thereof, while the input vector $\vec{a}(t)$ is a n dimensional vector.

In the sub-process S12, the computing unit determines whether any fuzzy rule is built. If no fuzzy rule is built, the computing unit will than execute the sub-process S13, but the computing unit will execute the sub-process S15 instead if at least one fuzzy rule has been built. In this embodiment, the sub-process S13 certainly follows the sub-process S12 while the sub-process S12 is executed for the first time since there is no fuzzy rule built initially.

In the sub-process S13, the computing unit defines a fuzzy rule corresponding to the retrieved input-output pair by function approximation. Specifically, the way to process the function approximation is not limited, and Recursive Singular Value Decomposition (RSVD) serves as the function approximation in this embodiment to obtain an optimal solution of the input-output pair. Generally, the fuzzy rule can be shown as the following:

IF $x_1$ is $A_{j,1}$ and $x_2$ is $A_{j,2}$ and ... and $x_n$ is $A_{j,n}$, THEN
    y is $c_{j,0}+c_{j,1}x_1+c_{j,2}x_2+\ldots+c_{j,n}x_n$  (2), wherein all the coefficients $c_{j,i}|_n^{i=0}$ can be obtained through the said function approximation.

In the sub-process S14, the computing unit determines whether there is any ungrouped input-output pair of the training data in the data storage unit. If no more ungrouped input-output pair exists, it indicates that the rule-defining process S1 ends, and thus the network-building process S2 should be then executed. Otherwise, if there is still any ungrouped input-output pair in the data storage unit, the computing unit will then execute the sub-process S11 to retrieve one of the remaining input-output pairs. In this embodiment, the sub-process S11 certainly follows the sub-process S14 since there are plural input-output pairs and only one of them is grouped. Besides, after the sub-processes S11, S12 are processed for the second time, the sub-process S15 is executed since one fuzzy rule is obtained.

Figure 3:
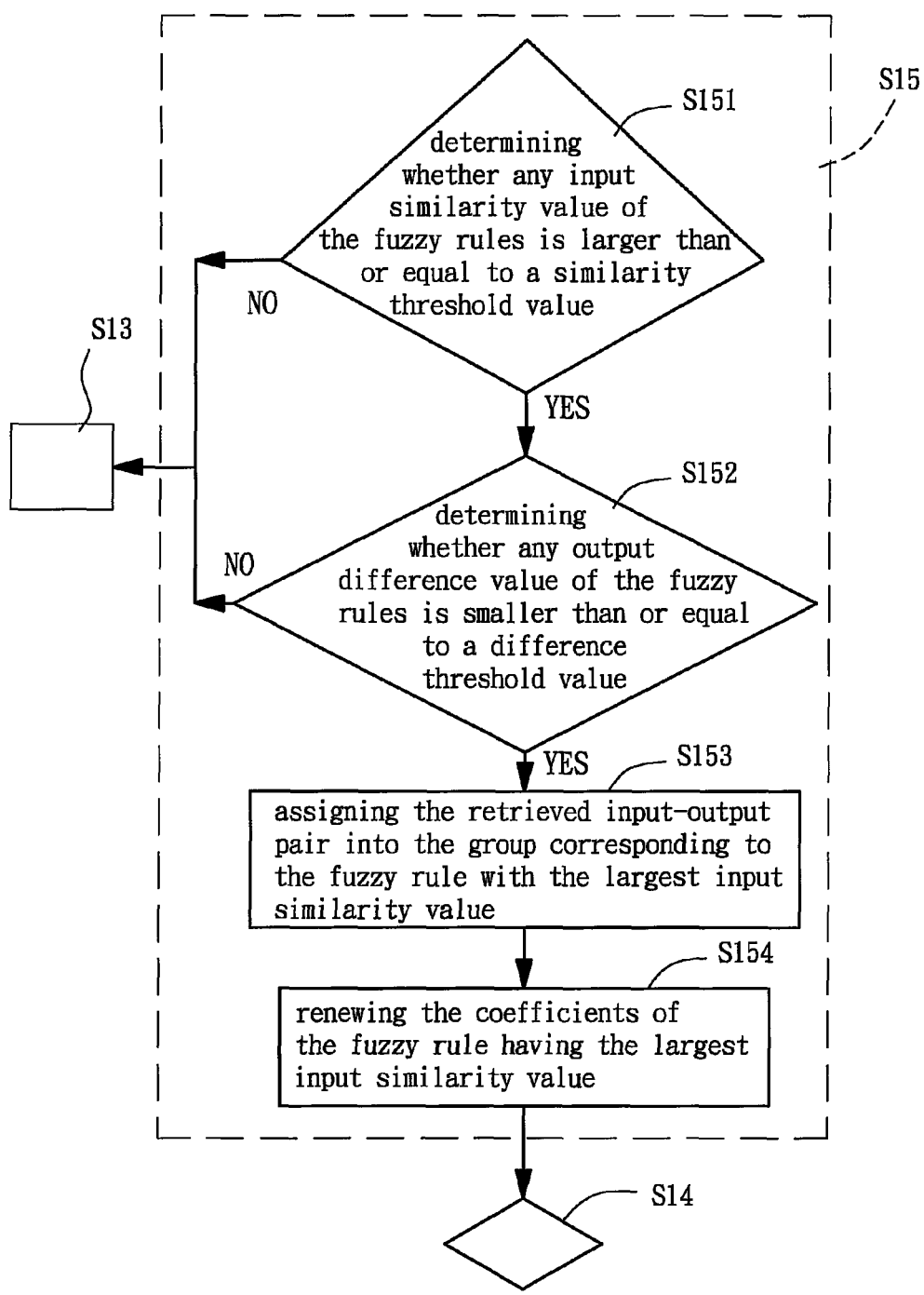
FIG. 3 shows a flow chart of a sub-process S15 of the preferable embodiment.

In the sub-process S15, the computing unit calculates an input similarity value "G" and an output difference value "D" between the present retrieved input-output pair and a respect fuzzy rule for each one of the present fuzzy rules, and determines whether the input similarity value "G" of a respect fuzzy rule is larger than or equal to a similarity threshold value "$\rho^I$" as well as the output difference value "D" of this fuzzy rule is smaller than or equal to a difference threshold value "$\rho^O$." If none of the fuzzy rules has an input similarity value "G" larger than or equal to the similarity threshold value "$\rho^I$" and an output difference value "D" smaller than or equal to the difference threshold value "$\rho^O$," the computing unit will then execute the sub-process S13 so as to establish a new group corresponding to a new fuzzy rule. Alternatively, if any fuzzy rule has an input similarity value "G" not smaller than the similarity threshold value "$\rho^I$" as well as its output difference value "D" is not larger than the difference threshold value "$\rho^O$," the computing unit will assign the input-output pair into a group corresponding to a fuzzy rule with the largest input similarity value "G" and then renews the coefficients $c_{j,i}|_n^{i=0}$ of this fuzzy rule. Finally, the computing unit executes the sub-process S14 after the coefficients $c_{j,i}|_n^{i=0}$ are renewed. Specifically, the sub-process S15 can be further illustrated in the following steps S151-S154 as shown in FIG. 3.

In the step S151, the computing unit calculates the input similarity values "G" through a similarity equation, wherein the similarity equation can be shown as the following:

$$G_j(\vec{a}(t)) = \prod_{i=1}^{n} \exp\left[-\left(\frac{a_i(t)-m_{ij}}{\sigma_{ij}}\right)^2\right], j=1,2,\ldots,J, \quad (3)$$

with the $m_{ij}$ and $\sigma_{ij}$ representing the mean and standard deviation of the input similarity values "G" respectively. Besides, the similarity threshold value "$\rho^I$" can be of a predetermined value in accordance with user's need, such as 0.01 in this embodiment. Finally, the step S152 will be executed while the following equation (4) is matched, which means that the input of the input-output pair and the fuzzy rule is similar; otherwise, the computing unit will perform the sub-process S13.

$$G_j(\vec{a}_i) \geq \rho^I \qquad (4)$$

In the step S152, the computing unit further calculates the output difference values "D" through a difference equation, wherein the difference equation can be shown as the following:

$$d_j(t) = \frac{|(c_{j,0} + c_{j,1}(t)a_1(t) + \ldots + c_{j,n}a_n(t) - b(t))|}{\sqrt{c_{j,1}^2 + c_{j,2}^2 + \ldots + c_{j,n}^2}}. \qquad (5)$$

The difference threshold value "$\rho^O$" can be of a predetermined value in accordance with user's need, such as 0.1 in this embodiment. Finally, the step S153 will be executed while the following equation (6) is matched, which means that the difference between the output of the input-output pair and the fuzzy rule is small; otherwise, the computing unit will perform the sub-process S13.

$$d_j(t) \leq \rho^O \qquad (6).$$

In the step S153, the computing unit compares the input similarity values "G" of the fuzzy rules that pass through the steps S151, S152, assigns the input-output pair into the group corresponding to the fuzzy rule with the largest input similarity value "G" and executes the step S154.

Finally, in the step S154, the computing unit renews the coefficients $c_{j,i}|_n^{i=0}$ of the fuzzy rule having the largest input similarity value "G" as well as the mean $m_{ij}$ and standard deviation $\sigma_{ij}$ thereof. Specifically, the refined coefficients $c_{j*,i}|_n^{i=0}$ can still be obtained by function approximation, such as RSVD used in S13, and the refined mean $m_{ij*}$ and standard deviation $\sigma_{ij*}$ are obtained by the following equations:

$$m_{ij*} = \frac{S_{j*} m_{ij*} + a_i(t)}{S_{j*} + 1}, i = 1, 2, \ldots, n, \qquad (7)$$

$$tempA = \frac{(S_{j*} - 1)(\sigma_{ij*} - \sigma_{i0})^2 + S_{j*} m_{ij*}^2}{S_{j*}}, \qquad (8)$$

$$tempB = \frac{S_{j*} + 1}{S_{j*}}\left(\frac{S_{j*} m_{ij*} + a_i(t)}{S_{j*}}\right), \qquad (9)$$

$$\sigma_{ij*} = \sqrt{tempA + tempB} + \sigma_{i0}, i = 1, 2, \ldots, n, \qquad (10)$$

wherein $S_{j*}$ is the number of the input-output pairs originally included in the group corresponding to the fuzzy rule having the largest input similarity value "G."

Figure 4:
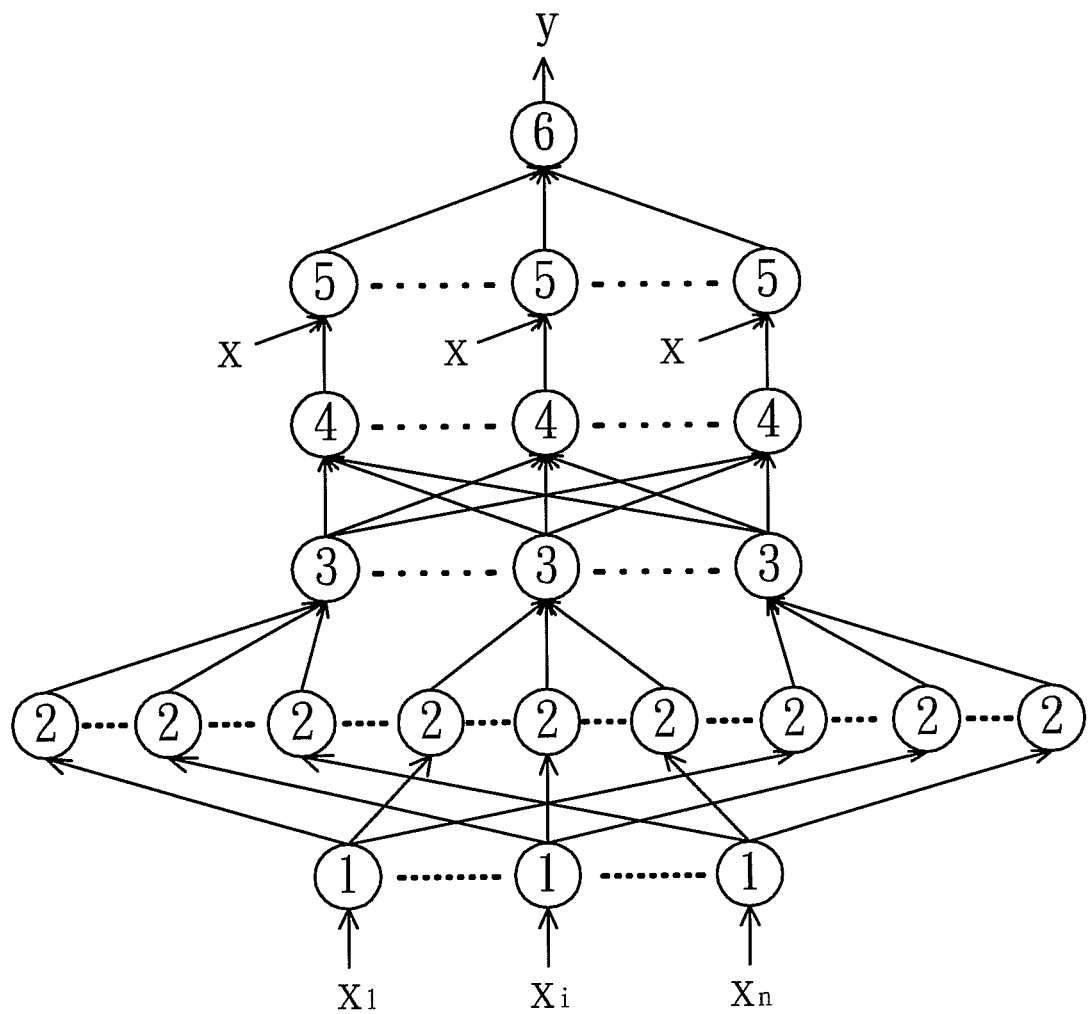
FIG. 4 shows a structural diagram of a fuzzy neural network of the preferable embodiment.

In the network-building process S2, the computing unit constructs a fuzzy neural network based on the fuzzy rules obtained by the rule-defining process S1. The structure of this fuzzy neural network is not limited, and the one used in this embodiment includes an input layer 1, a fuzzification layer 2, a rule layer 3, a normalization layer 4, a consequent layer 5 and an output layer 6 as shown in FIG. 4.

The input layer 1 includes n input nodes corresponding to the n dimensions of the input, and an output function of the input layer 1 can be shown as:

$$O_i^{(1)} = x_i, i = 1, 2, \ldots, n \qquad (11).$$

The fuzzification layer 2 includes j groups, with each group having n nodes corresponding to the n input nodes of the input layer 1, so that there are j×n nodes in total. Specifically, an output function of the fuzzification layer 2 can be shown as:

$$o_{ij}^{(2)} = G(o_i^{(1)}; m_{ij}; \sigma_{ij}) = \exp\left[-\left(\frac{x_i - m_{ij}}{\sigma_{ij}}\right)^2\right], \qquad (12)$$

$$i = 1, 2, \ldots, n, j = 1, 2, \ldots, J,$$

wherein the number "J" represents the number of the fuzzy rules.

The rule layer 3 is constructed by J nodes and calculates a rule firing strength, which is a product of all the n nodes in one group of the fuzzification layer 2, for every said group. An output function of the rule layer 3 can be shown as:

$$o_j^{(3)} = \prod_{i=1}^{n} o_{i,j}^{(2)} = \prod_{i=1}^{n} \exp\left[-\left(\frac{x_i - m_{ij}}{\sigma_{ij}}\right)^2\right], j = 1, 2, \ldots, J. \qquad (13)$$

The normalization layer 4 has J nodes which receive the output of the J nodes of the rule layer 3 and normalize them respectively. An output function of the normalization layer 4 can be shown as:

$$o_j^{(4)} = \frac{o_j^{(3)}}{\sum_{j=1}^{J} o_j^{(3)}}, j = 1, 2, \ldots, J. \qquad (14)$$

The consequent layer 5 calculates the corresponding rule output according to the normalized rule firing strength with the following equation:

$$O_j^{(5)} = O_j^{(4)} \times y_j = O_j^{(4)} \times (c_{j,0} + c_{j,1} x_1 + c_{j,2} x_2 + \ldots + c_{j,n} x_n),$$
$$j = 1, 2, \ldots, J \qquad (15).$$

The output layer 6 sums up all the outputs of the consequent layer 5, and an output function of the output layer 6 can be shown as:

$$o^{(6)} = y = \sum_{j=1}^{J} o_j^{(5)}. \qquad (16)$$

The present invention is characterized in that the coefficients $c_{j,i}|_n^{i=0}$ are previously settled in the rule-defining process S1 when the input-output pairs of the training data are assigned to groups corresponding to respective fuzzy rules, and thus the calculating loading of the network-building process S2 is lower then that of the parameter identification of a conventional neuro-fuzzy system. Accordingly, the constructed neuro-fuzzy system of the present invention is extremely similar to an original function that generates the training data.

In order to prove the performance of the proposed modeling method, two conventional modeling methods disclosed in two specific references are shown. The first one of them is "Type-2 Takagi-Sugeno-Kang Fuzzy Logic Modeling Using Subtractive Clustering" proposed by Q. Ren etc., the second one thereof is "A Neuro-Fuzzy System Modeling with Self-Constructing Rule Generation and Hybrid SVD-Based Learning" proposed by S. J. Lee etc., and they are called as the $1^{st}$ and $2^{nd}$ references in the following.

Furthermore, the original function generates the training data is set as $$y = \begin{cases} \frac{\sin(x)}{x}, & x \neq 0 \\ 1, & x = 0, \end{cases} \quad (17)$$

while there are 121 input-output pairs in the training data, the similarity threshold value "$\rho^I$" is 0.01, and the difference threshold value "$\rho^O$" is 0.1. Besides, in order to quantify the performance of each modeling method, the root mean square error (RMSE) is introduced, which is shown as:

$$RMSE = \frac{1}{\sqrt{\frac{1}{N} \sum_{i=1}^{N} (q(t) - y(t))^2}}, \quad (18)$$

wherein q(t) is a desired output, and y(t) is the network output. Accordingly, the value of RMSE will be low if a difference between the desired output and the network output is little, which means that the neuro-fuzzy system is similar to the original function. A table 1 in the following shows the RMSE values of the neuro-fuzzy systems of the present invention, the $1^{st}$ reference and the $2^{nd}$ reference, and it is apparent that the result of the neuro-fuzzy system of the present invention is much more better than those of the $1^{st}$ and $2^{nd}$ references.

TABLE 1

| NF system | RMSE value |
|---|---|
| $1^{st}$ reference | 0.2014 |
| $2^{nd}$ reference | 0.1056 |
| Present invention | 0.0398 |

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A modeling method of neuro-fuzzy system, comprising:
a rule-defining process dividing a plurality of training data into a plurality of groups to accordingly define a plurality of fuzzy rules; and
a network-building process constructing a fuzzy neural network based on the fuzzy rules obtained by the rule-defining process;
wherein the rule-defining process further comprises a sub-process (a) retrieving an input-output pair of the training data, a sub-process (b) determines whether any fuzzy rule is built so as to execute a sub-process (c) if no fuzzy rule is built or to execute a sub-process (e) if at least one fuzzy rule has been built, the sub-process (c) defining a fuzzy rule corresponding to the retrieved input-output pair by function approximation, a sub-process (d) determining whether there is any ungrouped input-output pair of the training data so as to execute the network-building process if no ungrouped input-output pair exists or to execute the sub-process (a) otherwise, and the sub-process (e) calculating an input similarity value and an output difference value between the retrieved input-output pair and a respect fuzzy rule for each one of the fuzzy rules, determining whether the input similarity value of a respect fuzzy rule is larger than or equal to a similarity threshold value as well as the output difference value of this fuzzy rule is smaller than or equal to a difference threshold value, assigning the retrieved input-output pair into a group corresponding to one of the fuzzy rules and then renewing coefficients of this fuzzy rule if any fuzzy rule has an input similarity value not smaller than the similarity threshold value as well as the output difference value thereof is not larger than the difference threshold value or executing the sub-process (c) otherwise, wherein the fuzzy rule corresponding to the group including the retrieved input-output pair has a largest input similarity value.

2. The modeling method of neuro-fuzzy system as claimed in claim 1, wherein the sub-process (e) comprises:
a step (i) calculating the input similarity values through a similarity equation, and executing the sub-process (c) if each input similarity value is smaller than the similarity threshold value or executing a step (ii) if at least one of the input similarity values is larger than or equal to the similarity threshold value;
the step (ii) calculating the output difference values through a difference equation, and executing the sub-process (c) if each output difference value is larger than the difference threshold value or executing a step (iii) if at least one of the input similarity values is smaller than or equal to the difference threshold value;
the step (iii) comparing the input similarity values of the fuzzy rules, assigning the retrieved input-output pair into the group corresponding to the fuzzy rule with the largest input similarity value, and executing a step (iv); and
the step (iv) renewing the coefficients of the fuzzy rule having the largest input similarity value and executing the sub-process (d).

3. The modeling method of neuro-fuzzy system as claimed in claim 2, wherein the similarity equation is $$G_j(\vec{a}(t)) = \prod_{i=1}^{n} \exp\left[-\left(\frac{a_i(t) - m_{ij}}{\sigma_{ij}}\right)^2\right],$$

with j=1, 2, . . . , J, the $m_{ij}$ representing a mean parameter of the input similarity values, and the $\sigma_{ij}$ representing a standard deviation parameter of the input similarity values.

4. The modeling method of neuro-fuzzy system as claimed in claim 2, wherein the difference equation is $$d_j(t) = \frac{|(c_{j,0} + c_{j,1}(t)a_1(t) + \ldots + c_{j,n}a_n(t) - b(t))|}{\sqrt{c_{j,1}^2 + c_{j,2}^2 + \ldots + c_{j,n}^2}}.$$

5. The modeling method of neuro-fuzzy system as claimed in claim 1, wherein recursive singular value decomposition serves as the function approximation in sub-process (c).

* * * * *